Dec. 5, 1933.  C. J. BIVER ET AL  1,938,212

THERMIONIC TUBE POWER CONVERTER

Filed Feb. 24, 1932

Inventor
George William Bain
Carl John Biver

By Charles W. Hills
Attorney

Patented Dec. 5, 1933

1,938,212

UNITED STATES PATENT OFFICE 1,938,212

THERMIONIC TUBE POWER CONVERTER

Carl John Biver and George William Bain, Owensboro, Ky., assignors to The Ken-Rad Corporation, Owensboro, Ky., a corporation of Kentucky Application February 24, 1932. Serial No. 594,940

8 Claims. (Cl. 171—97)

This invention relates to power conversion apparatus of the thermionic tube type employing alternating current circuits in connection therewith.

It is a primary object of our invention to provide means whereby power may be converted so that a high voltage direct current load may be supplied from a low voltage direct current source.

Figure 1:
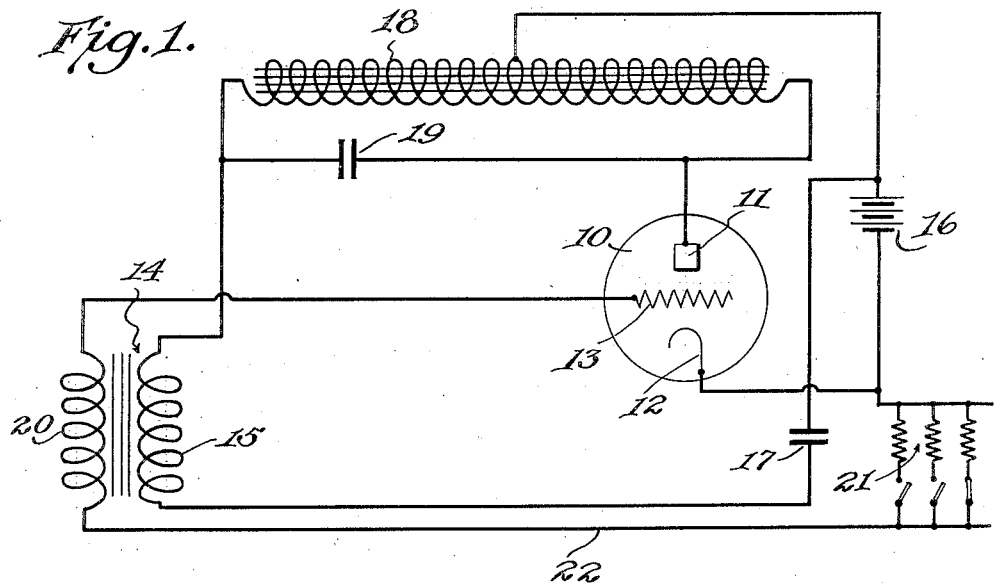
Figure 1 illustrates schematically an arrangement of instrumentalities employed in carrying out our invention.

Referring particularly to Figure 1, the numerals 10 indicate generally a thermionic tube of the vapor type provided with an inert gas. The tube 10 has an anode 11, a cathode 12, a control grid 13, and a cathode heater (not shown).

A step-up transformer 14 has one end of its primary winding 15 connected to the positive terminal of a direct current source, such as a battery 16, through a blocking condenser 17. The other end of the primary winding 15 is connected to one end of an inductance 18, and the other end of this inductance 18 is connected to the anode 11. The positive terminal of the battery 16 is connected to the mid-point of the inductance 18.

A condenser 19 is connected in parallel with the inductance 18.

One end of a secondary winding 20 of the transformer is connected to the grid 13, and the other end of this winding is connected to a direct current load circuit 21 by a conductor 22. The direct current load circuit 21 is connected to the cathode 12 and the conductor 22.

When the cathode has been heated to a suitable temperature and the battery 16 is applied to the anode circuit of the tube an electric discharge takes place between the cathode and the anode.

In a manner now well understood the current surges produce an alternating current in the secondary of the transformer, and because of the rectifying characteristics of the discharge in the tube half wave pulses of unidirectional current are supplied to the direct current load circuit.

Figure 2:
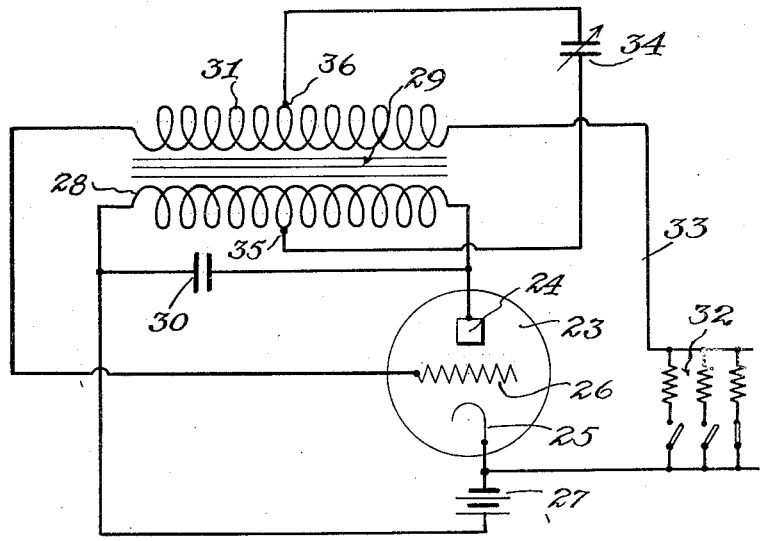
Figure 2 illustrates schematically a modified arrangement.

Referring now to Figure 2: The numeral 23 indicates a thermionic tube of the vapor type having an anode 24, a cathode 25, a control grid 26, and a heater (not shown).

A source of direct current, such as a battery 27 has its positive terminal connected to one end of the primary winding 28 of a step-up transformer 29. The other end of the primary winding is connected to the anode 24, and a condenser 30 is connected in parallel with the primary winding. The negative terminal of the battery 27 is connected to the cathode 25.

A secondary winding 31 of the transformer 29 is connected at one end to the grid 26, and the other end of the secondary is connected to a load circuit 32, through a conductor 33.

The load circuit is connected to conductor 33 and to the cathode 25. A variable condenser 34 is connected to the mid points 35 and 36 of the primary and secondary windings, respectively. By adjusting the capacitance of condenser 34 the frequency of the alternating currents generated by the tube may be varied, and we have found that, within a definite range of frequencies, the higher the frequency the greater the efficiency of conversion.

It will be apparent that with suitable values of inductance and capacitance in the circuits associated with the tube alternating currents are produced in the secondaries of the transformers in a manner now well understood.

Because of the rectifying characteristics of the vapor discharge these alternating circuits are rectified so that half-wave pulses of unidirectional current are supplied to the load circuit.

It is a simple matter to control the frequency of the alternating currents and thereby the ripple frequency of the unidirectional current so that relatively inexpensive filter means connected to the direct current output terminals may readily smooth out the ripples.

A converter employing two tubes to produce full-wave rectification of the alternating current is described and claimed in a copending application, Serial No. 594,936 filed on even date herewith.

It has been found that when two tubes are used for full-wave rectification one of them may produce a glow discharge at a lower potential than the other, and thereby shunt the other enough to prevent the formation of a glow discharge therein. So, unless great care is taken in matching the tubes of a two-tube converter difficulty may be experienced in setting up alternating currents in the device.

When but one tube is used, it is a simple matter for an inexperienced user to "start" the tube by alternately interrupting and restoring the anode battery circuit.

We are aware that many changes may be made and numerous details of construction may be varied through a wide range without departing from the principles of this invention, and we therefore do not purpose limiting the patent granted thereon otherwise than necessitated by the prior art.

We claim:

1. In combination, a direct current load circuit, a direct current source, a single thermionic tube having an anode, a cathode and a control grid, inductive coil means connecting said tube and said load circuit and said current source cooperable with said tube to produce alternating currents and rectification of the produced currents, said load circuit being connected in the grid circuit of the tube.

2. In combination, a direct current load circuit, a direct current source, a single thermionic tube having a cathode, and a control grid, reactive means connecting said tube and said current source and said load circuit cooperable with said tube to produce alternating currents and rectification of the produced currents, said load circuit being connected to said grid and said cathode.

3. In combination, a thermionic tube having an anode, a cathode and a control grid, a direct current source, a reactor, means connecting said current source in series with said reactor in the anode circuit of said tube, another reactor, a direct current load circuit, means connecting said load circuit and said another reactor in series with said control grid, said load circuit being connected in the grid circuit of said tube.

4. In combination, a thermionic tube having an anode, a cathode, and a control grid, a transformer having a primary and a secondary magnetically coupling the anode and grid circuits of said tube, a direct current source connected in the anode circuit of said tube through the primary of said transformer, a direct current load circuit connected in the grid circuit of said tube through the secondary of said transformer, and a capacitor connecting the mid-point of said secondary to the mid-point of said primary.

5. In combination, a thermionic tube having an anode, a cathode, and a control grid, a reactor, a direct current source connected in the anode circuit of said tube in series with said reactor, a transformer having a primary and a secondary, a capacitor, means connecting said direct current source to said anode in series with said primary and said capacitor, a direct current load circuit, and means connecting said load circuit in the grid circuit of said tube in series with the secondary of said transformer.

6. In combination, a single thermionic tube provided with an anode, a cathode, a control grid, and an inert gas, a direct current source, a direct current load circuit, energy storing means in circuit connection with said source, said load circuit, and said tube cooperable to produce alternating currents and rectification of the produced currents, said load circuit being connected in the gird circuit of said tube.

7. Means to transfer energy from a source of direct current at one voltage to a direct current load circuit at another voltage, said means comprising circuits containing electrical energy storing elements, a single thermionic tube having a cathode, an anode, and a control grid in circuit connection with said energy storing elements, for the production of alternating currents and rectification of the produced currents, and a direct current load circuit connected between said cathode and said control grid.

8. Means to transfer energy from a source of direct current at one voltage to a direct current load circuit at another voltage, said means comprising a single thermionic tube having a cathode, an anode, and a control grid, tunable electric circuit means cooperatively connected to said cathode, said anode, and said control grid, and a direct current load circuit connected between said cathode and said control grid.

GEORGE WILLIAM BAIN.
CARL JOHN BIVER.